United States Patent
Ping

(10) Patent No.: US 10,090,018 B2
(45) Date of Patent: Oct. 2, 2018

(54) METHOD AND DEVICE FOR GENERATING VIDEO SLIDES

(71) Applicant: Beijing Kingsoft Internet Security Software Co., Ltd., Beijing (CN)

(72) Inventor: Qian Ping, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 59 days.

(21) Appl. No.: 15/320,038

(22) PCT Filed: Jul. 7, 2015

(86) PCT No.: PCT/CN2015/083489
§ 371 (c)(1),
(2) Date: Dec. 19, 2016

(87) PCT Pub. No.: WO2016/029745
PCT Pub. Date: Mar. 3, 2016

(65) Prior Publication Data
US 2017/0194031 A1    Jul. 6, 2017

(30) Foreign Application Priority Data
Aug. 29, 2014    (CN) .......................... 2014 1 0438685

(51) Int. Cl.
*G11B 27/031*    (2006.01)
*H04N 21/278*    (2011.01)
(Continued)

(52) U.S. Cl.
CPC ............ *G11B 27/031* (2013.01); *G06F 17/30* (2013.01); *G11B 27/34* (2013.01); *H04N 21/278* (2013.01);
(Continued)

(58) Field of Classification Search
CPC ....... G11B 27/031; G11B 27/34; G06F 17/30; H04N 21/278; H04N 21/440236; H04N 21/8153
See application file for complete search history.

(56) References Cited

U.S. PATENT DOCUMENTS

2013/0124998 A1*    5/2013    Pendergast ........... G11B 27/031
                                                              715/723

FOREIGN PATENT DOCUMENTS

CN    101657815    2/2010
CN    102915316    2/2013
(Continued)

OTHER PUBLICATIONS

International Search Report and Written Opinion issued in International Application No. PCT/CN2015/083489, dated Sep. 24, 2015.

*Primary Examiner* — Mishawn Hunter
(74) *Attorney, Agent, or Firm* — Norton Rose Fulbright US LLP

(57) ABSTRACT

A method and device for generating video slides, which relate to the technical field of picture and video processing, comprising: selecting pictures for generating video slides; creating and displaying a time axis, the selected pictures being distributed on the time axis according to a time sequence corresponding to time attributes of the pictures; receiving user settings for playing effects of subsequently generated video slides, wherein, the settings comprise settings for changing locations of the selected pictures on the time axis; generating the video slides according to the playing effects of the settings so as to play the selected pictures according to a location sequence on the time axis. The invention is suitable for a situation where playing effects of the video slides generated from pictures can be set conveniently.

20 Claims, 7 Drawing Sheets

(51) Int. Cl.
    *G11B 27/34*     (2006.01)
    *G06F 17/30*     (2006.01)
    *H04N 21/4402*     (2011.01)
    *H04N 21/81*     (2011.01)

(52) U.S. Cl.
    CPC . *H04N 21/440236* (2013.01); *H04N 21/8153* (2013.01)

(56) References Cited

FOREIGN PATENT DOCUMENTS

| | | |
|---|---|---|
| CN | 103931199 | 7/2014 |
| CN | 103988162 | 8/2014 |
| JP | 2010263341 | 11/2010 |

\* cited by examiner

```
                                                                    S5
determining, among the selected pictures, a picture belonging to a same
   picture group with the picture to which the first playing effect is set S6
setting the first playing effect for another picture belonging to the same
                            picture group
```

METHOD AND DEVICE FOR GENERATING VIDEO SLIDES

CROSS-REFERENCE TO RELATED APPLICATIONS

The present application is a national phase application under 35 U.S.C. § 371 of International Application No. PCT/CN2015/083489 filed Jul. 7, 2015, which claims priority to Chinese patent application No. 201410438685.8 filed Aug. 29, 2014 and entitled "Method and device for generating video slides". The entire contents of each of the above-referenced applications are incorporated into the present application by reference.

TECHNICAL FIELD

The present application relates to the technical field of picture and video processing, and particularly to a method and device for generating video slides.

BACKGROUND ART

In prior art, a user can store a plurality of pictures or photos (both hereinafter referred to as pictures) locally on a personal computer (PC), locally on a mobile device, or on a Cloud Server, these pictures are normally single picture source. A user can upload these pictures to the Internet for sharing. However, content and visual effect of pictures of such single picture source are relatively monotonous, and when a user wishes to share multiple pictures on the Internet, he/she needs to upload the pictures one by one. The content of the uploaded pictures is monotonous and it is inconvenient to operate for users.

In order to better satisfy user's requirements, various picture processing software has been developed currently. Some picture processing software provides a picture combining function, which can combine multiple pictures together to form a combined picture. For example, multiple pictures are combined together to form a combined picture by means of splicing. The combination of multiple pictures can enrich the content and visual effect of pictures. Moreover, it is only required to upload one combined picture so as to achieve the effect of uploading multiple pictures when a user shares the combined picture.

In prior art, the general method for combining pictures by a user is: firstly selecting pictures to be combined, selecting one combination template from a picture combination template library, and after clicking function buttons such as "Enter" or "Save", the pictures will be directly displayed on the user-selected combination template and directly display the final combination effect to the user. Although such existing picture combining method is convenient and rapid, the presented effect is static and the users' experience is relatively poor.

Some picture processing software, however, provides functions of generating video slides from pictures so as to display pictures dynamically. These functions enable to sequentially play multiple pictures so as to generate slides when a user views spliced combined pictures, the pictures can be traversed to displaying in a user-specified sequence with background music in the video, and at the same time, each of the pictures and the video as a whole can be re-edited.

When performing a function of generating video slides from pictures by means of a picture processing software, a user firstly needs to select a certain number of pictures, and then confirms the playing sequence of the pictures (e.g., the default sequence is a user-selected sequence), then the user can edit the pictures one by one, set the transitional effect between two pictures played sequentially, and add background music to the whole video, finally the picture processing software will utilize a default total duration of the video (or possibly playing time interval of the two neighboring pictures) or time information preset by a user, to sequentially play the user-selected pictures so as to generate video slides with an encoding format such as h.264 and a packaging container such as mp4.

In prior art, in order to satisfy the tailored requirements of users, these software normally provide a video overall preview interface. A user can change the playing sequence of pictures by long-press, dragging and other ways and can manually set the playing and displaying manner for each picture, thereby satisfying the tailored requirements of users. However, in the above step of setting playing effect, it becomes more complicated for a user to set when there are a large number of pictures.

SUMMARY OF THE INVENTION

In view of above, embodiments of the present application provide a method and device for generating video slides, which can set the playing effects of video slides generated from pictures more conveniently.

To achieve above objectives, embodiments of the present application adopt the following technical solutions:

In one aspect, embodiments of the present application provide a method for generating video slides, which comprises:

selecting pictures for generating video slides;

creating and displaying a time axis, the selected pictures being distributed on the time axis according to a time sequence corresponding to time attributes of the pictures;

receiving user settings for playing effects of subsequently generated video slides, wherein, the settings comprise settings for changing locations of the selected pictures on the time axis;

generating the video slides according to the playing effects of the settings so as to play the selected pictures according to a location sequence on the time axis.

By creating a time axis and by means of the settings for changing locations of pictures on the time axis, the method for generating video slides provided by embodiments of the present application is more visualized and clear and the operation procedure thereof is more convenient compared to the prior art.

In another aspect, embodiments of the present application provide a device for generating video slides, which comprises a selection unit, for selecting pictures for generating video slides;

a creation unit, for creating and displaying a time axis, the selected pictures being distributed on the time axis according to a time sequence corresponding to time attributes of the pictures;

a reception unit, for receiving user settings for playing effects of subsequently generated video slides, wherein, the settings comprise settings for changing locations of the selected pictures on the time axis;

a video slide generation unit, for generating the video slides according to the playing effects of the settings so as to play the selected pictures according to a location sequence on the time axis.

By creating a time axis and by means of the settings for changing locations of pictures on the time axis, the device for generating video slides provided by embodiments of the present application is more visualized and clear and the operation procedure thereof is more convenient compared to the prior art.

To achieve the above objectives, embodiments of the present application further provide a storage medium, wherein, the storage medium is configured to store an application program for executing the method for generating video slides of the present application when it is running.

To achieve the above objectives, embodiments of the present application further provide an application program, wherein, the application program is configured to execute the method for generating video slides of the present application when it is running.

To achieve the above objectives, embodiments of the present application further provide an electronic device comprising:

a processor, a memory, communication interfaces and communication bus;

the processor, the memory and the communication interfaces connecting to and communicating with each other via the communication bus;

the memory storing executable program codes;

the processor executing the program corresponding to the executable program codes stored in the memory by reading the executable program codes, so as to perform the steps of:

selecting pictures for generating video slides;

creating and displaying a time axis, the selected pictures being distributed on the time axis according to a time sequence corresponding to time attributes of the pictures;

receiving user settings for playing effects of subsequently generated video slides, wherein, the settings comprise settings for changing locations of the selected pictures on the time axis;

generating the video slides according to the playing effects of the settings so as to play the selected pictures according to a location sequence on the time axis.

DESCRIPTION OF FIGURES

In order to describe the embodiments of the present application or the technical solutions in the prior art more clearly, drawings required for describing the embodiments or the prior art will be described briefly below It is obvious that the drawings below are only for sonic embodiments of the present application and those skilled in the art can also obtain other drawings based on these drawings without any creative efforts.

DETAILED IMPLEMENTATION

The method and device for generating videos slide provided by embodiments of the present application will be described in detail in conjunction with the accompanying drawings.

It should be clear that the described embodiments are only some of the embodiments of the present application rather than all of the embodiments. All other embodiments obtained based on the embodiments of the present application by those skilled in the art without any creative efforts fall into the protection scope defined of the present application.

Figure 1:
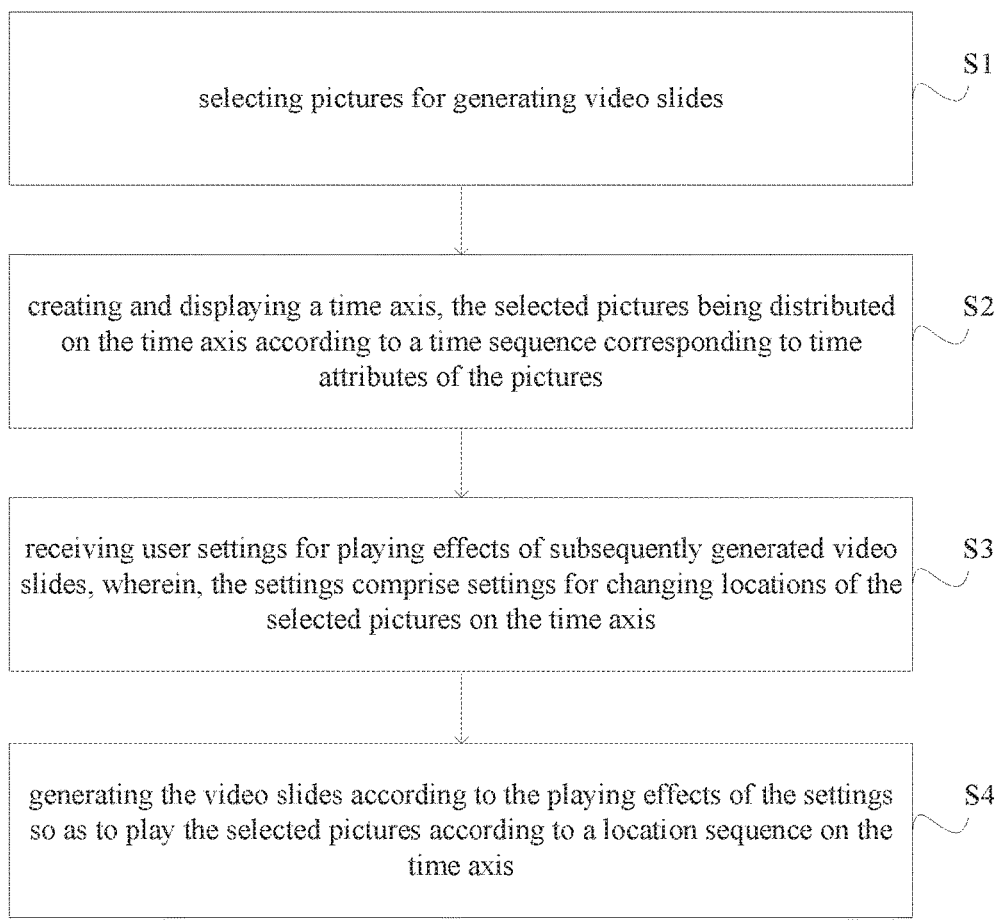
FIG. 1 is a schematic flowchart of an embodiment of a method for generating video slides of the present application.

Referring to FIG. 1, the embodiments of the present application provide a method for generating video slides, which comprises:

S1, selecting pictures for generating video slides;

A user can select a certain number of pictures as needed so as to generate video slides.

For example, a certain number of pictures stored locally are selected.

S2, creating and displaying a time axis, the selected pictures being distributed on the time axis according to a time sequence corresponding to time attributes of the pictures;

Specifically, the pictures on the time axis can be the thumbnails of the selected pictures.

The time axis can provide users with a time prompting function, which enables users to know the location sequence of pictures on the time axis (i.e., time sequence) by means of the time axis visually.

S3, receiving user settings for playing effects of subsequently generated video slides, wherein, the settings comprise settings for changing locations of the selected pictures on the time axis;

S4, generating the video slides according to the playing effects of the settings so as to play the selected pictures according to a location sequence on the time axis.

A user can perform individualized information settings for pictures according to the time axis.

By creating the time axis and by means of the settings for changing the locations of pictures on the time axis, the method for generating video slides provided by the embodiments of the present application is more visualized and clear and the operation procedure thereof is more convenient compared to the prior art.

Figure 2:
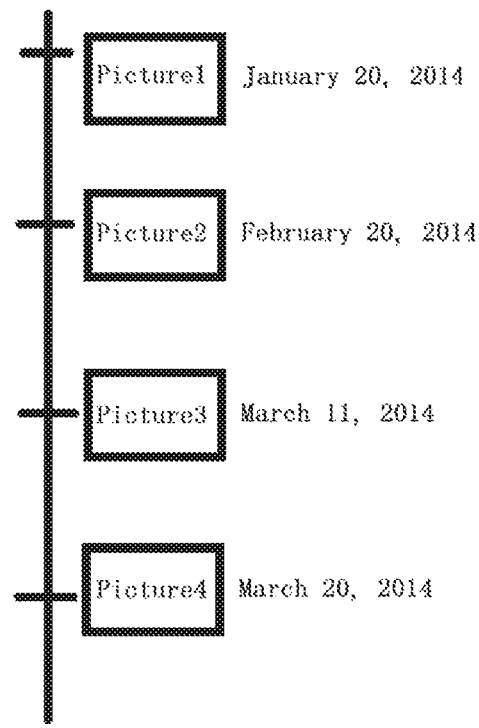
FIG. 2 is an illustration of displaying pictures on a time axis created based on creation time of the pictures in an embodiment of a method for generating video slides of the present application.

Optionally, referring to FIG. 2, in another embodiment of a method for generating video slides of the present application, the time attributes of the pictures may comprise a selection sequence of the pictures or creation time of the pictures;

correspondingly, the step of creating and displaying a time axis may comprise:

creating and displaying the time axis based on the selection sequence of the pictures, that is to say that the pictures are distributed on the time axis according to the selection sequence of the pictures; or creating and displaying the time axis based on the creation time of the pictures, that is to say that the pictures are distributed on the time axis according to the time sequence of the creation time of the pictures.

In the present embodiment, on a user interface, the time axis can be displayed in a vertical direction or a horizontal direction. The sequence can be a positive sequence or a reverse sequence by default. For example, FIG. 2 shows that the pictures are displayed on a time axis created based on the creation time of the pictures.

Optionally, in another embodiment of a method for generating video slides of the present application, a longer length interval between the locations of neighboring pictures on the time axis indicates a longer waiting time for a latter picture of the neighboring pictures to appear.

In this case, in S3, the received settings for changing locations of the selected pictures on the time axis may comprise:

settings for changing the location sequence of the selected pictures on the time axis and/or settings for changing the length interval between the locations on the time axis of neighboring pictures distributed on the time axis;

in S4, the step of generating the video slides according to the playing effects of the settings so as to play the selected pictures according to a location sequence on the time axis may comprise:

generating the video slides according to the playing effects of the settings so as to play the selected pictures according to the location sequence on the time axis as well as waiting time represented by the length intervals between the locations of neighboring pictures on the time axis.

In the present embodiment, by means of setting, on a time axis, the location sequence of the pictures and length intervals between the locations of the pictures, the playing sequence of the pictures is clear and it is possible to know the duration differences between waiting time represented by the length intervals between the locations on the time axis.

Optionally, in another embodiment of a method for generating video slides of the present application, the setting for changing locations of the selected pictures on the time axis may comprise:

settings for reversely sequencing the locations of the pictures on the time axis by sending a sequencing instruction by a user to adjust the locations of the selected pictures on the displayed time axis;

and/or settings for dragging, by a user, at least one of the pictures distributed on the time axis so as to adjust the locations of the pictures on the displayed time axis.

For example, a sequence reversing button can be provided near the time axis. When a user clicks on this button, the original positive location sequence of pictures distributed on the time axis will be adjusted to a reverse sequence, and the original reverse sequence will be adjusted back to a positive sequence.

For example, a user can change the locations of the pictures on the time axis by dragging the pictures distributed on the time axis, such as exchanging the locations of two pictures, or narrowing the distance between two pictures.

Optionally, in another embodiment of a method for generating video slides of the present application, the length interval between the locations of two neighboring pictures on the displayed time axis corresponds to the playing duration of a former picture of the two neighboring pictures;

the settings may further comprise user settings for the playing duration of a former picture in a pair of neighboring pictures on the time axis or user settings for the total playing duration of the video slides;

after receiving user settings for playing effects of subsequently generated video slides and before generating the video slides, the method may further comprise:

determining the playing duration of each of the pictures in the video slides, according to the locations of the pictures on the time axis and the user-set playing duration of a former picture in a pair of neighboring pictures, or according to the locations of the pictures on the time axis and the user-set total playing duration of the video slides;

correspondingly, the step of generating the video slides according to the playing effects of the settings so as to play the selected pictures according to a location sequence on the time axis may comprise:

generating the video slides according to the playing effects of the settings, so as to play the selected pictures according to the location sequence on the time axis and the determined playing duration.

In the present embodiment, the playing duration of each picture in the video slides is determined by setting the playing duration of the former picture in a pair of neighboring pictures on the time axis or setting the total playing duration of the video slides to be generated, which is very convenient.

Optionally, in another embodiment of a method for generating video slides of the present application, the settings may comprise user settings for the total playing duration of the video slides;

the step of determining the playing duration of each of the pictures in the video slides according to the locations of the pictures on the time axis and the user-set total playing duration of the video slide may comprise:

determining the playing duration $T1$ of a first picture of the selected pictures according to the following formula:

$$T1=L1/L*T$$

wherein, $L1$ represents a length interval between the locations of the first picture and of a second picture of the selected pictures on the time axis, the first and second pictures are two neighboring pictures distributed on the time axis and the second picture is located behind the first picture in the location sequence;

$L$ represents the total length of the time axis;

$T$ represents the user-set total playing duration of the video slides.

In the present embodiment, the playing duration of a picture of two neighboring pictures, which is located towards the front in the location sequence, is set as the duration between the locations of the neighboring pictures on the time axis, and differences between playing durations of the pictures on the time axis can be seen visually.

Optionally, in another embodiment of a method for generating video slides of the present application, the settings may comprise user settings for the playing duration of a first picture in a pair of neighboring pictures distributed on the time axis;

the step of determining the playing duration of each of the pictures in the video slides according to the locations of the pictures on the time axis and the user-set playing duration of a former picture in a pair of neighboring pictures may comprise:

determining the playing duration T3 of a third picture of the selected pictures according to the following formula:

$$T3=(T1/L1)*L3$$

wherein, T1 represents the user-set playing duration of the first picture;

L1 represents a length interval between the locations of the first picture and of a second picture in the pair of neighboring pictures on the time axis, and the second picture is located behind the first picture in the location sequence;

L3 represents a length interval between locations of the third picture and of a fourth picture on the time axis, the third and fourth pictures are two neighboring pictures and the fourth picture is located behind the third picture in the location sequence.

In the present embodiment, the playing duration represented by a unit length on the time axis is determined according to the playing duration of any one of the pictures on the time axis except the rearmost picture in the location sequence as well as the length interval on the time axis between this picture and another neighboring picture that is located right behind this picture in the location sequence, and the playing duration of a picture of neighboring pictures on the time axis which is located towards the front in the location sequence is further determined according to the playing duration represented by the unit length on a time axis, which enables a user to see the difference between playing durations of pictures on the time axis.

Optionally, in another embodiment of a method for generating video slides of the present application, the settings may further comprise: settings for a playing and displaying manner of at least one of the pictures;

before generating the video slides, the method may further comprise:

displaying playing effect information in a preset region on the displayed time axis corresponding to a picture to which the playing and displaying manner is set, so as to prompt the user;

correspondingly, the step of generating the video slides according to the playing effects of the settings so as to play the selected pictures according to a location sequence on the time axis may comprise:

generating the video slides according to the playing effects of the settings so as to play the selected pictures according to the location sequence on the time axis and the playing and displaying manner of the settings.

In the present embodiment, the playing and displaying manner means the displaying manner when a picture appears in video slides. Specifically, it is possible to set the playing and displaying manner for all the pictures as a whole or individually for each picture, the playing and displaying manner comprises translation, fade-in, zooming, fanning out and the like.

By displaying, before generating the video slides, the playing effect information in the preset region on the time axis corresponding to the picture to which the playing and displaying manner is set, it is possible for a user to preview the playing and displaying manner that he/she sets and to adjust the playing and displaying manner of the settings timely.

Figure 3:
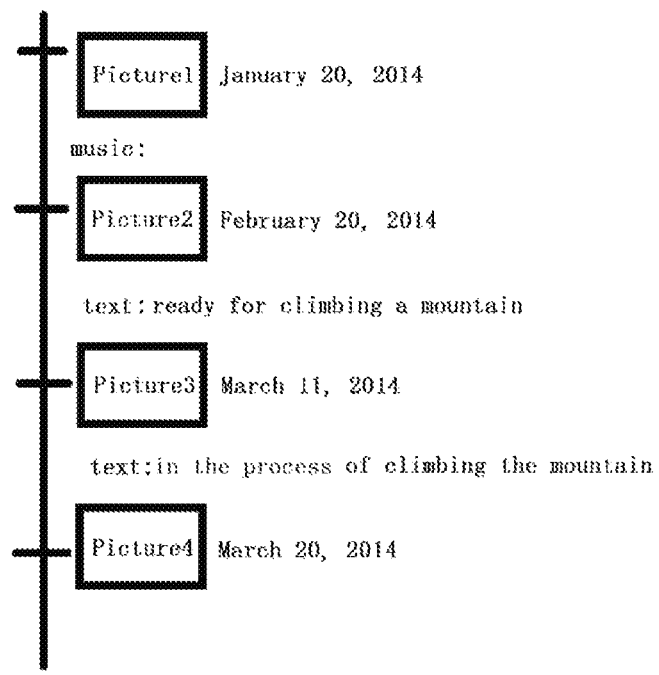
FIG. 3 is an illustration of adding music and texts in the interval between neighboring pictures in FIG. 2.
Figures 4, 5:
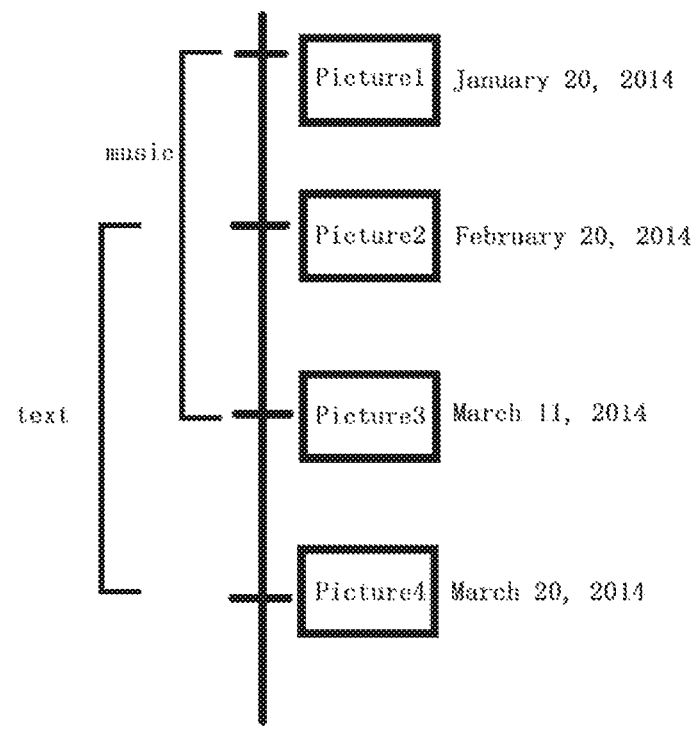
FIG. 4 is an illustration of adding music and texts to a picture in FIG. 2.
FIG. 5 is a partial schematic flowchart of another embodiment of a method for generating video slides of the present application.

Optionally, referring to FIGS. 2 to 4, in another embodiment of a method for generating video slides of the present application, the settings may further comprise: settings for adding, by a user, an element in an element adding location selected on the displayed time axis; wherein, the element may comprise at least one of music, a text and a sticker;

before generating the video slides, the method may further comprise:

displaying element adding information in a region corresponding to the element adding location on the displayed time axis, so as to prompt the user;

correspondingly, the step of generating the video slides according to the playing effects of the settings so as to play the selected pictures according to a location sequence on the time axis may comprise:

generating the video slides according to the playing effects of the settings of the pictures, so as to play the selected pictures according to the location sequence on the time axis and play the added element according to the location thereof on the time axis.

In the present embodiment, FIG. 3 shows the illustration of adding music, texts in the intervals between neighboring pictures in FIG. 2. Information such as music, texts is a separate pail of the video, and the overall playing sequence is picture 1->music->picture 2->text->picture 3->text->picture 4. FIG. 4 illustrates adding music, texts to pictures in FIG. 2. It starts to play music when picture 1 is showed, and the music continues during the showing of picture 2 and picture 3. A text emerges when picture 2 is showed, and the text continues emerging during the showing of picture 3 and picture 4.

In the present embodiment, an element is added to a picture on the time axis, which is visualized and very convenient. By displaying element adding information in a region corresponding to the element adding location on the time axis, it is possible for a user to preview his/her element adding settings and to adjust the added elements timely.

Optionally, referring to FIG. 5, in another embodiment of a method for generating video slides of the present application, the settings further comprise settings for, after a picture on the displayed time axis is selected by a user, first playing effect of the selected picture;

after receiving user settings for playing effects of subsequently generated video slides and before generating the video slides, the method may further comprise:

S5, determining, among the selected pictures, a picture belonging to a same picture group with the picture to which the first playing effect is set;

S6, setting the first playing effect for another picture belonging to the same picture group.

In the present embodiment, by applying the same settings of the playing effects of the picture to which the first playing effect is set to a picture belonging to the same picture group with the picture to which the first playing effect is set, it is possible to simplify the procedure of setting individualized information by a user when generating video slides from pictures for playing.

Optionally, in another embodiment of a method for generating video slides of the present application, the step of determining, among the selected pictures, a picture belonging to a same picture group with the picture to which the first playing effect is set, may comprise:

obtaining the creation time of the selected pictures, and determining the picture, among the selected pictures, the absolute value of the difference between the creation time of which and the creation time of the picture to which the first playing effect is set is smaller than a first threshold value, as the picture belonging to the same picture group with the picture to which the first playing effect is set;

or obtaining the geographic location information corresponding to the selected pictures, and determining, among the selected pictures, the picture whose geographic location information is within the same geographic location range with that of the picture to which the first playing effect is set, as the picture belonging to the same picture group with the picture to which the first playing effect is set.

In the present embodiment, by comparing the creation time with that of a picture to which the first playing effect is set, or comparing the geographic location information with that of a picture to which the first playing effect is set, it is possible to conveniently determine the pictures that belong to the same picture group with the picture to which the first playing effect is set.

Figure 6:
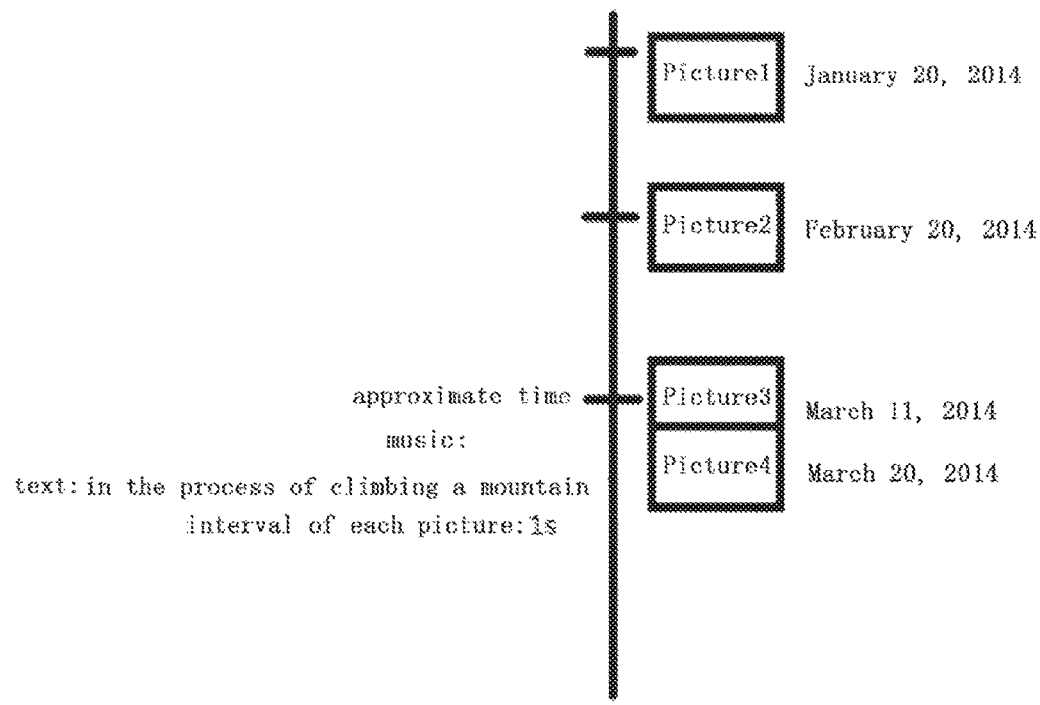
FIG. 6 is an illustration of uniformly applying the same settings of the playing effect of Pictures 3 (i.e., settings in terms of music, texts and playing duration) to all the pictures (i.e., Picture 4) in FIG. 2 other than Picture 3, which belong to the same picture group with Picture 3, after the pictures in FIG. 2 have been grouped according to the creation time.
Figure 7:
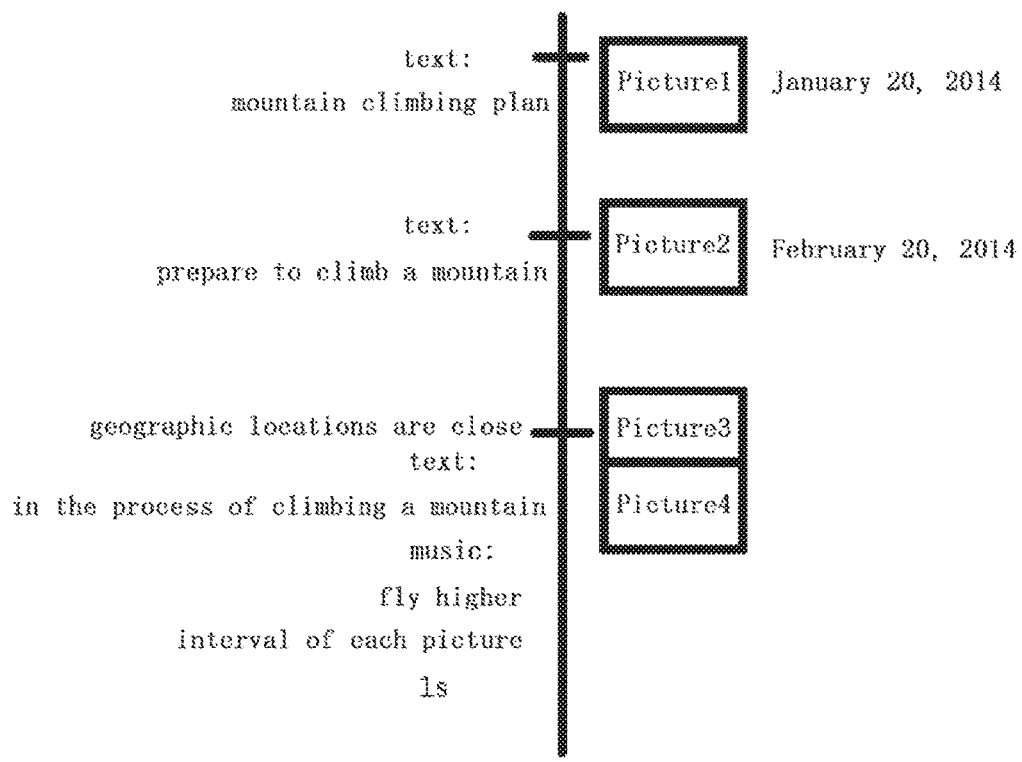
FIG. 7 is an illustration of uniformly applying the same settings of the playing effect of Picture 3 (i.e., settings in terms of music, texts and playing duration) to all the pictures (i.e., Picture 4) in FIG. 2 other than picture 3, which belong to the same picture group with picture 3 after the pictures in FIG. 2 have been grouped according to geographic location information carried by pictures.

Optionally, referring to FIGS. 2, 6 and 7, in another embodiment of a method for generating video slides of the present application, the settings for the first playing effect may comprise:

settings for a playing and displaying manner, settings for playing duration and/or settings for adding an element, wherein, the element may comprise at least one of music, a text and a sticker.

In the present embodiment, FIG. 6 illustrates uniformly applying the same settings of the playing effect of Pictures 3 (i.e., settings in terms of music, texts and playing duration) to all the pictures (i.e., Picture 4) in FIG. 2 other than Picture 3, which belong to the same picture group with Picture 3, after the pictures in FIG. 2 have been grouped according to the creation time. FIG. 7 is an illustration of uniformly applying the same settings of the playing effect of Picture 3 (i.e., settings in terms of music, texts and playing duration) to all the pictures (i.e., Picture 4) in FIG. 2 other than picture 3, which belong to the same picture group with picture 3 after the pictures in FIG. 2 have been grouped according to geographic location information carried by pictures.

Figure 8:
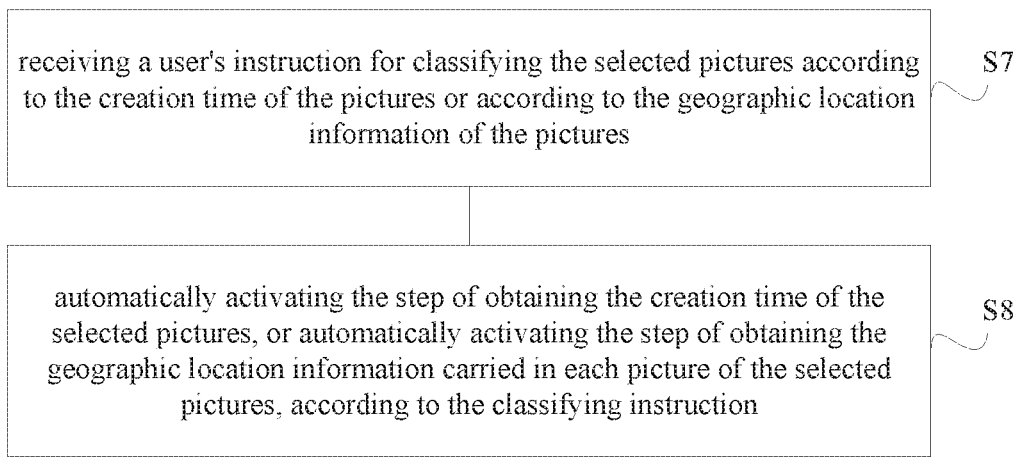
FIG. 8 is a partial schematic flowchart of another embodiment of a method for generating video slides of the present application.

Optionally, referring to FIG. 8, in another embodiment of a method for generating video slides of the present application, before determining, among the selected pictures, a picture belonging to a same picture group with the picture to which the first playing effect is set, the method may further comprise:

S7, receiving a user's instruction for classifying the selected pictures according to the creation time of the pictures or according to the geographic location information of the pictures;

S8, automatically activating the step of obtaining the creation time of the selected pictures, or automatically activating the step of obtaining the geographic location information carried in each picture of the selected pictures, according to the classifying instruction.

In the present embodiment, it is possible to provide a button for archiving according to the creation time of the pictures and/or a button for archiving according to the geographic location information of the pictures: the creation time of the selected pictures is obtained when a user clicks on the button for archiving according to the creation time of the pictures, and the geographic location information carried in each picture of the selected pictures is obtained when a user clicks on the button for archiving according to the geographic location information of the pictures.

Optionally, in another embodiment of a method for generating video slides of the present application, the step of generating the video slides according to the playing effects of the settings may comprise:

receiving a playing instruction from the user, generating and playing the video slides according to the playing instruction so as to play the pictures according to the location sequence of the pictures on the time axis successively.

In the present embodiment, a play button can be provided, which is configured to generate and play video slides when a user clicks on this button.

Figure 9:
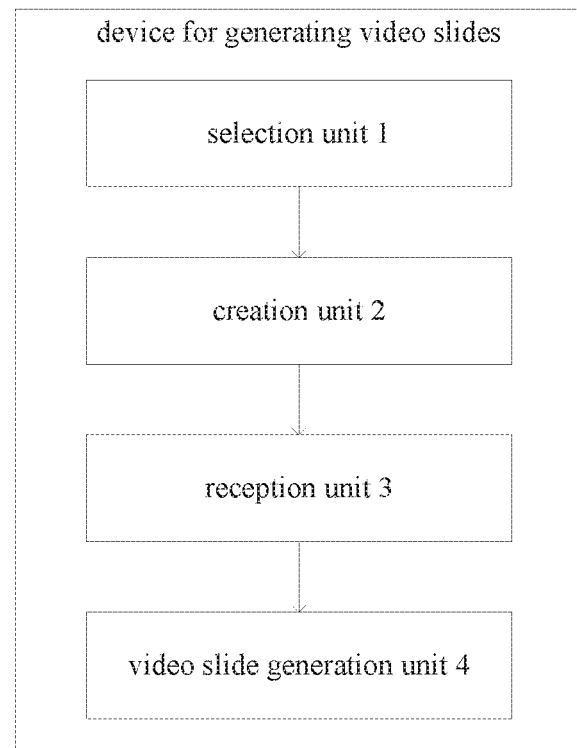
FIG. 9 is a schematic structural block diagram of an embodiment of a device for generating video slides of the present application.

Referring to FIG. 9, embodiments of the present application provide a device for generating video slides, the device comprises:

a selection unit 1, for selecting pictures for generating video slides;

a creation unit 2, for creating and displaying a time axis, the selected pictures being distributed on the time axis according to a time sequence corresponding to time attributes of the pictures;

a reception unit 3, for receiving user settings for playing effects of subsequently generated video slides, wherein, the settings may comprise settings for changing locations of the selected pictures on the time axis:

a video slide generation unit 4, for generating the video slides according to the playing effects of the settings so as to play the selected pictures according to a location sequence on the time axis.

By creating the time axis and by means of the settings for changing locations of pictures on the time axis, the device for generating video slides provided by the embodiments of the present application is more visualized and clear and the operation procedure thereof is more convenient compared to the prior art.

The methods and procedures of various embodiments of the device for generating video slides of the present application may be identical with those corresponding to various embodiments of the method for generating video slides of the present application, and will not be described in detail below.

Optionally, in another embodiment of a device for generating video slides of the present application, the time attributes of the pictures may comprise a selection sequence of the pictures or creation time of the pictures;

correspondingly, the creation unit may comprise:

a first creation subunit, for creating and displaying the time axis based on the selection sequence of the pictures; or a second creation subunit, for creating and displaying the time axis based on the creation time of the pictures.

In the present embodiment, on a user interface, the time axis can be displayed in a vertical direction or a horizontal direction. The sequence can be a positive sequence or a reverse sequence by default.

Optionally, in another embodiment of a device for generating video slides of the present application, a longer length interval between the locations of neighboring pictures on the time axis indicates a longer waiting time for a latter picture of the neighboring pictures to appear;

and thus the reception unit can be used for:

receiving user settings for changing a location sequence of the selected pictures on the time axis; and/or receiving user settings for changing a length interval between the locations on the time axis of neighboring pictures distributed on the time axis;

the video slide generation unit is used for generating the video slides according to the playing effects of the settings so as to play the selected pictures according to the location sequence on the time axis as well as waiting time represented by the length intervals between the locations of neighboring pictures on the time axis;

In the present embodiment, by means of setting, on a time axis, the location sequence and length intervals between the locations of the pictures, the playing sequence of the pictures is clear and it is possible to know the duration difference between waiting time represented by the length intervals between the locations on the time axis.

Optionally, in another embodiment of a device for generating video slides of the present application, the reception unit can be used for:

receiving settings for reversely sequencing the locations of the pictures on the time axis by sending a sequencing instruction by a user to adjust the locations of the selected pictures on the displayed time axis;

and/or receiving settings of dragging, by a user, at least one of the pictures distributed on the time axis so as to adjust the locations of the pictures on the displayed time axis, In the present embodiment, a sequence reversing button can be provided near the time axis. When a user clicks on this button, the original positive location sequence will be adjusted to a reverse sequence, and the original reverse sequence will be adjusted to a positive sequence.

Optionally, in another embodiment of a device for generating video slides of the present application, the length interval between the locations of two neighboring pictures on the displayed time axis corresponds to the playing duration of a former picture of the two neighboring pictures;

the reception unit is further used for receiving user settings for the playing duration of a former picture in a pair of neighboring pictures on the time axis or user settings for the total playing duration of the video slides;

the device may further comprise:

a first setting unit, for determining, after the reception unit receives user settings for playing effects of subsequently generated video slides, the playing duration of each of the pictures in the video slides according to the locations of the pictures on the time axis and the user-set playing duration of a former picture in a pair of neighboring pictures, or according to the locations of the pictures on the time axis and the user-set total playing duration of the video slides;

correspondingly, the video slide generation unit is used for generating the video slides according to the playing effects of the settings, so as to play the selected pictures according to the location sequence on the time axis and the determined playing duration.

In the present embodiment, the playing duration of each picture in the video slides is determined by setting the playing duration of the former picture in a pair of neighboring pictures on the time axis or the total playing duration of the video slides to be generated, which is very convenient.

Optionally, in another embodiment of a device for generating video slides of the present application, the first setting unit is used for determining the playing duration $T1$ of a first picture of the selected pictures according to the following formula:

$$T1 = L1/L * T$$

wherein, $L1$ represents a length interval between the locations of the first picture and of a second picture of the selected pictures on the time axis, the first and second pictures are two neighboring pictures distributed on the time axis and the second picture is located behind the first picture in the location sequence;

$L$ represents the total length of the time axis;

$T$ represents the user-set total playing duration of the video slides.

In the present embodiment, the playing duration of a picture of two neighboring pictures, which is located towards the front in the location sequence, is set as the duration between the locations of the neighboring pictures on the time axis, and the differences between playing durations of the neighboring pictures on the time axis can be seen visually.

Optionally, in another embodiment of a device for generating video slides of the present application, the first setting unit is used for determining the playing duration $T3$ of a third picture of the selected pictures according to the following formula:

$$T3 = (T1/L1) * L3$$

wherein, $T1$ represents the user-set playing duration of a former picture in a pair of neighboring pictures;

$L1$ represents a length interval between the locations of the pair of neighboring pictures on the time axis set by the user;

$L3$ represents a length interval between the locations of the third picture and of a fourth picture in the selected pictures on the time axis, the third and fourth pictures are two neighboring pictures and the fourth picture is located behind the third picture in the location sequence.

In the present embodiment, the playing duration represented by a unit length on the time axis is determined according to the playing duration of any one of the pictures on the time axis except the rearmost picture in the location sequence, as well as the length interval on the time axis between this picture and another picture that is located right behind this picture in the location sequence, and the playing duration of a picture of neighboring pictures on the time axis, which is located towards the front in the location sequence, is further determined according to the playing duration represented by the unit length on a time axis, which enables a user to see the difference between playing durations of pictures on the time axis.

Optionally, in another embodiment of a device for generating video slides of the present application, the reception unit is further used for receiving user settings for a playing and displaying manner of at least one of the pictures;

the device may further comprise:

a first displaying unit, for displaying, before the video slides are generated by the video slide generation unit, playing effect information in a preset region on the displayed time axis corresponding to a picture to which the playing and displaying manner is set, so as to prompt the user;

correspondingly, the video slide generation unit is used for generating the video slides according to the playing effects of the settings, so as to play the selected pictures according to the location sequence on the time axis and the playing and displaying manner of the settings.

In the present embodiment, it is possible to set the playing and displaying manner for all the pictures as a whole or individually for each picture, the playing and displaying manner comprises translation, fade-in, zooming and the like. By displaying, before generating the video slides, the playing effect information in a preset region on the displayed time axis corresponding to a picture to which the playing and displaying manner is set, it is possible for a user to preview the playing and displaying manner that he/she sets and to adjust the playing and displaying manner of the settings timely.

Optionally, in another embodiment of a device for generating video slides of the present application, the reception unit can be further used for receiving settings for adding, by a user, an element in an element adding location selected on the displayed time axis; wherein, the element comprises at least one of music, a text and a sticker;

the device may further comprise:

a second displaying unit, for displaying, before the video slides are generated by the video slide generation unit, element adding information in a region corresponding to the element adding location on the displayed time axis, so as to prompt the user;

correspondingly, the video slide generation unit is used for generating the video slides according to the playing effects of the settings of the pictures, so as to play the selected pictures according to the location sequence on the time axis and play the added element according to the location thereof on the time axis.

In the present application, settings for adding an element to a picture on a time axis is very convenient and visualized. By displaying element adding information in a region corresponding to the element adding location on a time axis, it is possible for a user to preview his/her element adding settings and to adjust the added elements timely.

Figure 10:
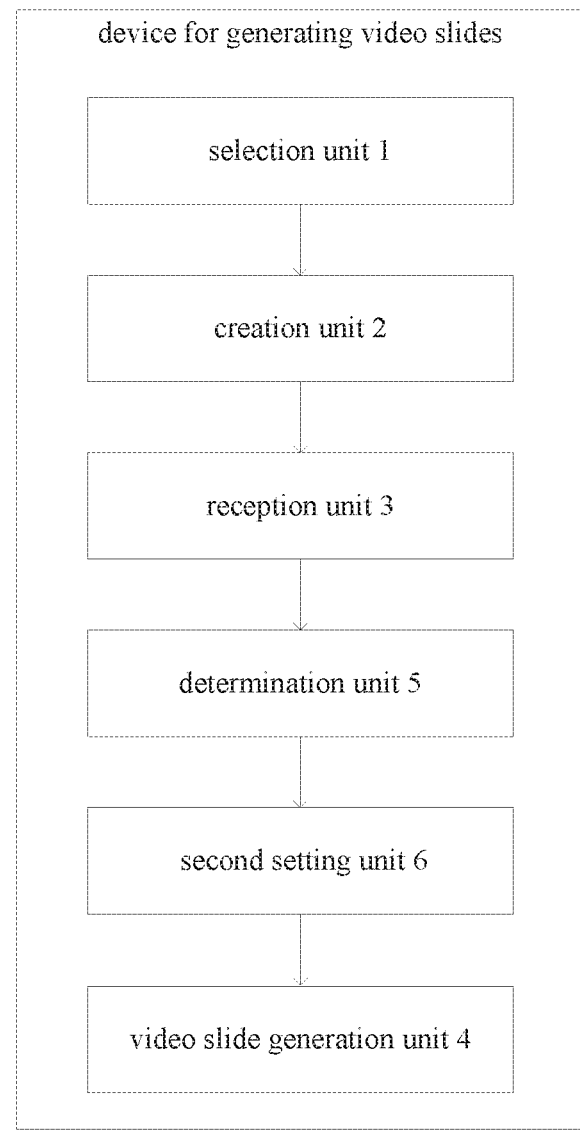
FIG. 10 is a schematic structural block diagram of another embodiment of a device for generating video slides of the present application.

Optionally, referring to FIG. 10, in another embodiment of a device for generating video slides of the present application, the reception unit is further used for receiving settings for the first playing effect of the selected picture, after a picture on the displayed time axis is selected by a user;

the device may further comprise:

a determination unit 5, for determining, among the selected pictures, a picture belonging to a same picture group with the picture to which the first playing effect is set, after the reception unit 3 receives user settings for playing effects of subsequently generated video slides;

a second setting unit 6, for setting the first playing effect to another picture belonging to the same picture group.

In the present embodiment, by applying the same settings of the playing effects of the picture to which the first playing effect is set to a picture belonging to the same picture group with the picture for which the first playing effect is set, it is possible to simplify the procedure of setting individualized information by a user when generating video slides from pictures for playing.

Optionally, in another embodiment of a device for generating video slides of the present application, the determination unit may comprise:

a first determination subunit, for obtaining the creation time of the selected pictures, and determining, among the selected pictures, the picture the absolute value of the difference between the creation time of which and the creation time of the picture to which the first playing effect is set is smaller than a first threshold value, as the picture belonging to the same picture group with the picture to which the first playing effect is set; or a second determination subunit, for obtaining the geographic location information corresponding to the selected pictures, and determining, among the selected pictures, the picture whose geographic location information is within the same geographic location range with that of the picture to which the first playing effect is set, as the picture belonging to the same picture group with the picture to which the first playing effect is set.

In the present embodiment, by comparing the creation time of the pictures with the creation time of a picture to which the first playing effect is set, or comparing the geographic location information of the pictures with that of a picture to which the first playing effect is set, it is possible to conveniently determine the pictures that belong to the same picture group with the picture to which the first playing effect is set.

Optionally, in another embodiment of a device for generating video slides of the present application, the settings for the first playing effect may comprise:

settings for a playing and displaying manner, settings for playing duration and/or settings for adding an element, wherein, the element may comprise at least one of music, a text and a sticker.

Figure 11:
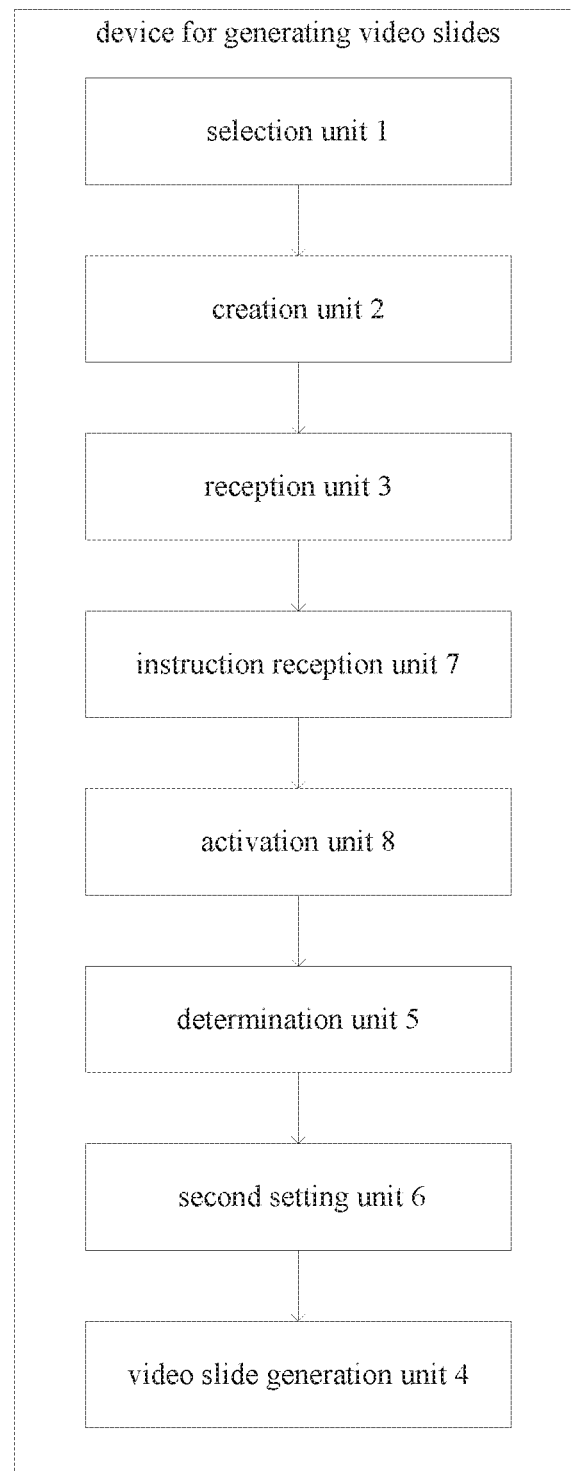
FIG. 11 is a schematic structural block diagram of another embodiment of a device for generating video slides of the present application.

Optionally, referring to FIG. 11, in another embodiment of a device for generating video slides of the present application, the device may comprise:

an instruction reception unit 7, for receiving a user's instruction for classifying the selected pictures according to the creation time of the pictures or according to the geographic location information of the pictures, before the determination unit 5 determines, among the selected pictures, a picture belonging to a same picture group with the picture to which the first playing effect is set;

an activation unit 8, for automatically activating the first determination subunit to obtain the creation time of the selected pictures or automatically activating the second determination subunit to obtain the geographic location information carried in each picture of the selected pictures, according to the classifying instruction received by the instruction reception unit 7.

In the present embodiment, it is possible to provide a button for archiving according to the creation time of pictures and/or a button for archiving according to the geographic location information of the pictures: the creation time of the selected pictures is obtained when a user clicks on the button for archiving according to the creation time of the pictures, and the geographic location information carried in each picture of the selected pictures is obtained when a user clicks on the button for archiving according to the geographic location information of the pictures.

Optionally, in another embodiment of a device for generating video slides of the present application, the video slide generation unit is used for receiving a playing instruction from the user, generating and playing the video slides according to the playing instruction so as to play the pictures according to the location sequence of the pictures on the time axis successively.

In the present embodiment, a play button can be provided, which is configured to generate and play video slides when a user clicks on this button.

To achieve the above objectives, embodiments of the present application further provide a storage medium, wherein, the storage medium is configured to store an application program for executing the method for generating video slides provided by the embodiments of the present application when running. Wherein, the method for generating video slides provided in the present application comprises:

selecting pictures for generating video slides;

creating and displaying a time axis, the selected pictures being distributed on the time axis according to a time sequence corresponding to time attributes of the pictures;

receiving user settings for playing effects of subsequently generated video slides, wherein, the settings comprise settings for changing locations of the selected pictures on the time axis;

generating the video slides according to the playing effects of the settings so as to play the selected pictures according to a location sequence on the time axis.

To achieve the above objectives, embodiments of the present application further provide an application program, wherein, the application program is configured to execute the method for generating video slides provided by the embodiments of the present application program when in operation. Wherein, the method for generating video slides provided in the present application comprises:

selecting pictures for generating video slides;

creating and displaying a time axis, the selected pictures being distributed on the time axis according to a time sequence corresponding to time attributes of the pictures;

receiving user settings for playing effects of subsequently generated video slides, wherein, the settings comprise settings for changing locations of the selected pictures on the time axis;

generating the video slides according to the playing effects of the settings so as to play the selected pictures according to a location sequence on the time axis.

To achieve the above objectives, embodiments of the present application further provide an electronic device comprising:

a processor, a memory, communication interfaces and communication bus;

the processor, the memory and the communication interfaces connecting to and communicating with each other via the communication bus;

the memory storing executable program codes;

the processor executing the program corresponding to the executable program codes stored in the memory by reading the executable program codes, so as to perform the steps of:

selecting pictures for generating video slides;

creating and displaying a time axis, the selected pictures being distributed on the time axis according to a time sequence corresponding to time attributes of the pictures;

receiving user settings for playing effects of subsequently generated video slides, wherein, the settings comprise settings for changing locations of the selected pictures on the time axis;

generating the video slide according to the playing effects of the settings so as to play the selected pictures according to a location sequence on the time axis.

It should be understood by a person skilled in the art that, all or a part of procedures in the implementations of the above method can be carried out by the related hardware instructed by computer programs which can be stored in a computer readable storage medium, and can comprise the procedures of the above embodiments of a method when the program is running. Wherein, the storage medium may be a magnetic disc, an optical disc, a read-only memory (ROM) or a random access memory (RAM) and the like.

The above disclosed embodiments are only the specific implementations of the present application, to which the protection scope of the present application is not limited. Any alterations or substitutions that can be easily arrived at by a person skilled in the art within the technical scope disclosed by the present application should fall in the protection scope of the present application. Thus, the protection scope of the present application should be determined by the protection scope of the claims.

What is claimed is:

1. A method for generating video slides, characterized in that it comprises:

selecting pictures for generating video slides;

creating and displaying a time axis, the selected pictures being distributed on the time axis according to a time sequence corresponding to time attributes of the pictures;

receiving user settings for playing effects of subsequently generated video slides, wherein, the settings comprise settings for changing locations of the selected pictures on the time axis, user settings for the playing duration of a former picture in a pair of neighboring pictures on the time axis or user settings for the total playing duration of the video slides;

generating the video slides according to the playing effects of the settings so as to play the selected pictures according to a location sequence on the time axis, and wherein when the settings comprise user settings for the total playing duration of the video slides, the step of determining the playing duration of each of the pictures in the video slides according to the locations of the pictures on the time axis and the user-set total playing duration of the video slides comprises:

determining the playing duration $T1$ of a first picture of the selected pictures according to the following formula:

$$T1 = L1/L * T$$

wherein, $L1$ represents a length interval between the locations of the first picture and of a second picture of the selected pictures on the time axis, the first and second pictures are two neighboring pictures distributed on the time axis and the second picture is located behind the first picture in the location sequence;

$L$ represents the total length of the time axis;

$T$ represents the user-set total playing duration of the video slides.

2. The method for generating video slides according to claim 1, characterized in that, the time attributes of the pictures comprise a selection sequence of the pictures or creation time of the pictures;

correspondingly, the step of creating and displaying a time axis comprises:

creating and displaying the time axis based on the selection sequence of the pictures; or creating and displaying the time axis based on the creation time of the pictures.

3. The method for generating video slides according to claim 1, characterized in that, a longer length interval between the locations of neighboring pictures on the time axis indicates a longer waiting time for a latter picture of the neighboring pictures to appear;

the settings for changing locations of the selected pictures on the time axis comprise:

settings for changing the location sequence of the selected pictures on the time axis and/or settings for changing the length interval between the locations on the time axis of neighboring pictures distributed on the time axis;

the step of generating the video slides according to the playing effects of the settings so as to play the selected pictures according to a location sequence on the time axis comprises:

generating the video slides according to the playing effects of the settings so as to play the selected pictures according to the location sequence on the time axis as well as waiting time represented by the length intervals between the locations of neighboring pictures on the time axis.

4. The method for generating video slides according to claim 1, characterized in that, the settings for changing locations of the selected pictures on the time axis comprise:

settings for reversely sequencing the locations of the pictures on the time axis by sending a sequencing instruction by a user to adjust the locations of the selected pictures on the displayed time axis;

and/or settings for dragging, by a user, at least one of the pictures distributed on the time axis so as to adjust the locations of the pictures on the displayed time axis.

5. The method for generating video slides according to claim 1, characterized in that, the length interval between the locations of two neighboring pictures on the displayed time axis corresponds to the playing duration of a former picture of the two neighboring pictures;

after receiving user settings for playing effects of subsequently generated video slides and before generating the video slides, the method further comprises:

determining the playing duration of each of the pictures in the video slides according to the locations of the pictures on the time axis and the user-set playing duration of a former picture in a pair of neighboring pictures, or according to the locations of the pictures on the time axis and the user-set total playing duration of the video slides;

correspondingly, the step of generating the video slides according to the playing effects of the settings so as to play the selected pictures according to a location sequence on the time axis comprises:

generating the video slides according to the playing effects of the settings, so as to play the selected pictures according to the location sequence on the time axis and the determined playing duration.

6. The method for generating video slides according to claim 5, characterized in that, when the settings comprise user settings for the playing duration of a first picture in a pair of neighboring pictures distributed on the time axis, the step of determining the playing duration of each of the pictures in the video slides according to the locations of the pictures on the time axis and the playing duration of a former picture in a pair of neighboring pictures comprises:

determining the playing duration T3 of a third picture of the selected pictures according to the following formula:

$$T3=(T1/L1)*L3$$

wherein, T1 represents the user-set playing duration of the first picture;

L1 represents a length interval between the locations of the first picture and of a second picture in the pair of neighboring pictures on the time axis, and the second picture is located behind the first picture in the location sequence;

L3 represents a length interval between the locations of the third picture and of a fourth picture on the time axis, the third picture and fourth picture are two neighboring pictures and the fourth picture is located behind the third picture in the location sequence.

7. The method for generating video slides according to claim 1, characterized in that, the settings further comprise one of the following settings: settings for a playing and displaying manner of at least one of the pictures; settings for adding an element by a user in an element adding location selected on the displayed time axis, wherein, the element comprises at least one of music, a text and a sticker; and settings for, after a picture on the displayed time axis is selected by a user, first playing effect for the selected picture;

when the settings comprise settings for a playing and displaying manner of at least one of the pictures, before generating the video slides, the method further comprises:

displaying playing effect information in a preset region on the displayed time axis corresponding to a picture to which the playing and displaying manner is set, so as to prompt the user;

correspondingly, the step of generating the video slides according to the playing effects of the settings so as to play the selected pictures according to a location sequence on the time axis, comprises:

generating the video slides according to the playing effects of the settings so as to play the selected pictures according to the location sequence on the time axis and the playing and displaying manner of the settings;

when the settings comprise settings for adding an element by a user in an element adding location selected on the displayed time axis, before generating the video slides, the method further comprises:

displaying element adding information in a region corresponding to the element adding location on the displayed time axis, so as to prompt the user;

correspondingly, the step of generating the video slides according to the playing effects of the settings so as to play the selected pictures according to a location sequence on the time axis comprises:

generating the video slides according to the playing effects of the settings of the pictures so as to play the selected pictures according to the location sequence on the time axis and play the added element according to the location thereof on the time axis;

when the settings comprise settings for, after a picture on the displayed time axis is selected by a user, first playing effect for the selected picture, after receiving user settings for playing effects of subsequently generated video slides and before generating the video slides, the method further comprises:

determining, among the selected pictures, a picture belonging to a same picture group with the picture to which the first playing effect is set;

setting the first playing effect for another picture belonging to the same picture group.

8. The method for generating video slides according to claim 7, characterized in that, the step of determining, among the selected pictures, a picture belonging to a same picture group with the picture to which the first playing effect is set comprises:

obtaining the creation time of the selected pictures, and determining the picture, among the selected pictures, the absolute value of the difference between the creation time of which and the creation time of the picture to which the first playing effect is set is smaller than a first threshold value, as the picture belonging to the same picture group with the picture to which the first playing effect is set;

or obtaining the geographic location information corresponding to the selected pictures, and determining, among the selected pictures, the picture whose geographic location information is within the same geographic location range with that of the picture to which the first playing effect is set, as the picture belonging to the same picture group with the picture to which the first playing effect is set.

9. The method for generating video slides according to claim 8, characterized in that, before determining, among the selected pictures, a picture belonging to a same picture group with the picture to which the first playing effect is set, the method further comprises:

receiving a user's instruction for classifying the selected pictures according to the creation time of the pictures or according to the geographic location information of the pictures;

automatically activating the step of obtaining the creation time of the selected pictures, or automatically activating the step of obtaining the geographic location information carried in each picture of the selected pictures, according to the classifying instruction.

10. The method for generating video slides according to claim 1, characterized in that, the step of generating the video slides according to the playing effects of the setting comprises:

receiving a playing instruction from the user, generating and playing the video slides according to the playing instruction so as to play the pictures according to the location sequence of the pictures on the time axis successively.

11. An electronic device for generating video slides, characterized in that it comprises:

a processor, a memory, communication interfaces and communication bus;

the processor, the memory and the communication interfaces connecting to and communicating with each other via the communication bus;

the memory storing executable program codes;

the processor executing the program corresponding to the executable program codes stored in the memory by reading the executable program codes, so as to perform the steps of:

selecting pictures for generating video slides;

creating and displaying a time axis, the selected pictures being distributed on the time axis according to a time sequence corresponding to time attributes of the pictures;

receiving user settings for playing effects of subsequently generated video slides, wherein, the settings comprise settings for changing locations of the selected pictures on the time axis, user settings for the playing duration of a former picture in a pair of neighboring pictures on the time axis or user settings for the total playing duration of the video slides;

generating the video slides according to the playing effects of the settings so as to play the selected pictures according to a location sequence on the time axis, and wherein when the settings comprise user settings for the total playing duration of the video slides, the step of determining the playing duration of each of the pictures in the video slides according to the locations of the pictures on the time axis and the user-set total playing duration of the video slides comprises:

determining the playing duration T1 of a first picture of the selected pictures according to the following formula:

$$T1 = L1/L * T$$

wherein, L1 represents a length interval between the locations of the first picture and of a second picture of the selected pictures on the time axis, the first and second pictures are two neighboring pictures distributed on the time axis and the second picture is located behind the first picture in the location sequence;

L represents the total length of the time axis;

T represents the user-set total playing duration of the video slides.

12. The electronic device for generating video slides according to claim 11, characterized in that, the time attributes of the pictures comprise a selection sequence of the pictures or creation time of the pictures;

correspondingly, the step of creating and displaying a time axis comprises:

creating and displaying the time axis based on the selection sequence of the pictures;

or creating and displaying the time axis based on the creation time of the pictures.

13. The electronic device for generating video slides according to claim 11, characterized in that, a longer length interval between the locations of neighboring pictures on the time axis indicates a longer waiting time for a latter picture of the neighboring pictures to appear;

the settings for changing locations of the selected pictures on the time axis comprise:

settings for changing the location sequence of the selected pictures on the time axis; and/or settings for changing the length interval between the locations on the time axis of neighboring pictures distributed on the time axis; and the step of generating the video slides according to the playing effects of the settings so as to play the selected pictures according to a location sequence on the time axis comprises:

generating the video slides according to the playing effects of the settings so as to play the selected pictures according to the location sequence on the time axis as well as waiting time represented by the length intervals between the locations of neighboring pictures on the time axis.

14. The electronic device for generating video slides according to claim 11, characterized in that, the settings for changing locations of the selected pictures on the time axis comprise:

settings for reversely sequencing the locations of the pictures on the time axis by sending a sequencing instruction by a user to adjust the locations of the selected pictures on the displayed time axis;

and/or settings for dragging, by a user, at least one of the pictures distributed on the time axis so as to adjust the locations of the pictures on the displayed time axis.

15. The electronic device for generating video slides according to claim 11, characterized in that, the length interval between the locations of two neighboring pictures on the displayed time axis corresponds to the playing duration of a former picture of the two neighboring pictures;

after receiving user settings for the playing effects of subsequently generated video slides and before generating the video slides, the processor further performs the step of:

determining the playing duration of each of the pictures in the video slides according to the locations of the pictures on the time axis and the user-set playing duration of a former picture in a pair of neighboring pictures, or according to the locations of the pictures on the time axis and the user-set total playing duration of the video slides;

correspondingly, the step of generating the video slides according to the playing effects of the settings so as to play the selected pictures according to a location sequence on the time axis comprises:

generating the video slides according to the playing effects of the settings so as to play the selected pictures according to the location sequence on the time axis and the determined playing duration.

16. The electronic device for generating video slides according to claim 15, characterized in that, when the settings comprise user settings for the playing duration of a first picture in a pair of neighboring pictures distributed on the time axis, the step of determining the playing duration of each of the pictures in the video slides according to the locations of the pictures on the time axis and the playing duration of a former picture in a pair of neighboring pictures comprises:

determining the playing duration T3 of a third picture of the selected pictures according to the following formula:

$$T3=(T1/L1)*L3$$

wherein, T1 represents the user-set playing duration of a former picture in a pair of neighboring pictures;

L1 represents a length interval between the locations of the pair of neighboring pictures on the time axis;

L3 represents a length interval between the locations of the third picture and of a fourth picture of the selected pictures on the time axis, the third and fourth pictures are two neighboring pictures and the fourth picture is located behind the third picture in the location sequence.

17. The electronic device for generating video slides according to claim 11, characterized in that, the settings further comprise one of the following settings: settings for a playing and displaying manner of at least one of the pictures; settings for adding an element by a user in an element adding location selected on the displayed time axis, wherein, the element comprises at least one of music, a text and a sticker; and settings for, after a picture on the displayed time axis is selected by a user, first playing effect for the selected picture;

when the settings comprise settings for a playing and displaying manner of at least one of the pictures, before generating the video slides, the processor further performs the step of:

displaying playing effect information in a preset region on the displayed time axis corresponding to a picture to which the playing and displaying manner is set, so as to prompt the user;

correspondingly, the step of generating the video slides according to the playing effects of the settings so as to play the selected pictures according to a location sequence on the time axis, comprises:

generating the video slides according to the playing effects of the settings so as to play the selected pictures according to the location sequence on the time axis and the playing and displaying manner of the settings;

when the settings comprise settings for adding an element by a user in an element adding location selected on the displayed time axis, before generating the video slides, the processor further performs the step of:

displaying element adding information in a region corresponding to the element adding location on the displayed time axis, so as to prompt the user;

correspondingly, the step of generating the video slides according to the playing effects of the settings so as to play the selected pictures according to a location sequence on the time axis comprises:

generating the video slides according to the playing effects of the setting of the pictures, so as to play the selected pictures according to the location sequence on the time axis and play the added element according to the location thereof on the time axis;

when the settings comprise settings for the first playing effect of the selected picture after a picture on the displayed time axis is selected by a user, after receiving user settings for playing effects of subsequently generated video slides and before generating the video slides, the processor further performs the step of:

determining, among the selected pictures, a picture belonging to a same picture group with the picture to which the first playing effect is set;

setting the first playing effect for another picture belonging to the same picture group.

18. The electronic device for generating video slides according to claim 17, characterized in that, the step of determining, among the selected pictures, a picture belonging to a same picture group with the picture to which the first playing effect is set comprises:

obtaining the creation time of the selected pictures, and determining the picture, among the selected pictures, the absolute value of the difference between the creation time of which and the creation time of the picture to which the first playing effect is set is smaller than a first threshold value as the picture belonging to the same picture group with the picture to which the first playing effect is set; or obtaining the geographic location information corresponding to the selected pictures, and determining, among the selected pictures, the picture whose geographic location information is within the same geographic location range with that of the picture to which the first playing effect is set as the picture belonging to the same picture group with the picture to which the first playing effect is set.

19. The electronic device for generating video slides according to claim 18, characterized in that before determining, among the selected pictures, a picture belonging to a same picture group with the picture to which the first playing effect is set, the processor further performs the step of:

receiving a user's instruction for classifying the selected pictures according to the creation time of the pictures or according to the geographic location information of the pictures;

automatically activating the step of obtaining the creation time of the selected pictures, or automatically activating the step of obtaining the geographic location information carried in each picture of the selected pictures, according to the classifying instruction.

20. The electronic device for generating video slides according to claim 11, characterized in that, the step of generating the video slides according to the playing effects of the setting comprises:

receiving a playing instruction from the user, generating and playing the video slides according to the playing instruction so as to play the pictures according to the location sequence of the pictures on the time axis successively.

* * * * *